US008721458B2

(12) United States Patent
Shimabukuro et al.

(10) Patent No.: US 8,721,458 B2
(45) Date of Patent: May 13, 2014

(54) NVRAM MANAGEMENT IN A WAGERING GAME MACHINE

(75) Inventors: Jorge Luis Shimabukuro, Las Vegas, NV (US); Srinivyasa M. Adiraju, Vernon Hills, IL (US); Mark J. Saletnik, Mount Prospect, IL (US); Ranjan Dasgupta, Naperville, IL (US)

(73) Assignee: WMS Gaming Inc., Waukegan, IL (US)

( * ) Notice: Subject to any disclaimer, the term of this patent is extended or adjusted under 35 U.S.C. 154(b) by 197 days.

(21) Appl. No.: 12/741,883

(22) PCT Filed: Nov. 7, 2008

(86) PCT No.: PCT/US2008/012604

§ 371 (c)(1), (2), (4) Date: May 7, 2010

(87) PCT Pub. No.: WO2009/061488

PCT Pub. Date: May 14, 2009

(65) Prior Publication Data

US 2010/0248819 A1 Sep. 30, 2010

Related U.S. Application Data

(60) Provisional application No. 60/987,028, filed on Nov. 9, 2007.

(51) Int. Cl.
*A63F 13/00* (2006.01)

(52) U.S. Cl.
USPC .................. 463/43; 463/24; 463/25; 463/29; 365/228; 365/229; 711/104

(58) Field of Classification Search
USPC .......................................................... 463/24
See application file for complete search history.

(56) References Cited

U.S. PATENT DOCUMENTS

| | | | |
|---|---|---|---|
| 5,579,522 | A | 11/1996 | Christeson et al. |
| 5,680,570 | A | 10/1997 | Rantala et al. |
| 6,205,548 | B1 | 3/2001 | Hasbun |
| 6,251,014 | B1 | 6/2001 | Stockdale et al. |
| 6,295,594 | B1 | 9/2001 | Meier |
| 6,314,483 | B1 | 11/2001 | Goto et al. |

(Continued)

FOREIGN PATENT DOCUMENTS

| | | | |
|---|---|---|---|
| NO | WO-2009061488 | A1 | 5/2009 |
| WO | WO-2007095368 | A2 | 8/2007 |
| WO | WO-2007095368 | A3 | 8/2007 |

OTHER PUBLICATIONS

"International Application Serial No. PCT/US2008/012604, International Preliminary Report on Patentability mailed Feb. 25, 2010", 11 pgs.

(Continued)

*Primary Examiner* — Ronald Laneau
*Assistant Examiner* — Justin Myhr
(74) *Attorney, Agent, or Firm* — Nixon Peabody LLP

(57) ABSTRACT

Systems and methods are used to manage the contents of NVRAM in a wagering game machine. NVRAM may be pre-allocated for various purposes prior to loading a first wagering game on a the wagering game machine. A second wagering may be loaded on the wagering game machine. The second wagering game reuses the pre-allocated NVRAM portions for the same purposes as the first wagering game.

22 Claims, 9 Drawing Sheets

(56) References Cited

U.S. PATENT DOCUMENTS

| | | | | |
|---|---|---|---|---|
| 6,322,450 | B1 | 11/2001 | Nakano | |
| 6,412,053 | B2 * | 6/2002 | Bonola | 711/170 |
| 6,582,311 | B1 | 6/2003 | Sugimura | |
| 6,595,860 | B1 | 7/2003 | Yamamoto et al. | |
| 6,743,103 | B2 | 6/2004 | Sugimura | |
| 6,773,389 | B2 | 8/2004 | Hlavinka et al. | |
| 6,775,738 | B2 | 8/2004 | Ash et al. | |
| 6,804,763 | B1 | 10/2004 | Stockdale et al. | |
| 6,884,162 | B2 | 4/2005 | Raverdy et al. | |
| 6,965,989 | B1 | 11/2005 | Strange et al. | |
| 7,111,141 | B2 | 9/2006 | Nelson | |
| 7,133,994 | B2 | 11/2006 | Abbey | |
| 7,384,339 | B2 | 6/2008 | LeMay et al. | |
| 7,441,084 | B2 | 10/2008 | Henshaw et al. | |
| 7,610,462 | B2 | 10/2009 | Gagner et al. | |
| 7,618,317 | B2 | 11/2009 | Jackson | |
| 7,704,147 | B2 | 4/2010 | Quraishi et al. | |
| 7,722,468 | B2 | 5/2010 | Cockerille et al. | |
| 7,736,234 | B2 | 6/2010 | Cockerille et al. | |
| 7,766,745 | B1 * | 8/2010 | Green | 463/29 |
| 7,798,900 | B2 | 9/2010 | Nguyen | |
| 7,819,750 | B2 | 10/2010 | Lam et al. | |
| 7,931,533 | B2 | 4/2011 | LeMay et al. | |
| 7,988,559 | B2 | 8/2011 | Yoseloff et al. | |
| 2002/0026566 | A1 * | 2/2002 | Awada et al. | 711/162 |
| 2002/0049909 | A1 | 4/2002 | Jackson et al. | |
| 2003/0073497 | A1 | 4/2003 | Nelson | |
| 2004/0147314 | A1 * | 7/2004 | LeMay et al. | 463/30 |
| 2004/0166931 | A1 * | 8/2004 | Criss-Puszkiewicz et al. | 463/29 |
| 2004/0198479 | A1 | 10/2004 | Martinek | |
| 2005/0007337 | A1 * | 1/2005 | Sellen et al. | 345/156 |
| 2005/0010738 | A1 | 1/2005 | Stockdale et al. | |
| 2005/0101383 | A1 * | 5/2005 | Wells | 463/39 |
| 2005/0164795 | A1 * | 7/2005 | Whitten et al. | 463/44 |
| 2005/0251617 | A1 * | 11/2005 | Sinclair et al. | 711/103 |
| 2006/0190552 | A1 * | 8/2006 | Henze et al. | 709/216 |
| 2006/0287109 | A1 | 12/2006 | Mercado et al. | |
| 2007/0005919 | A1 * | 1/2007 | van Riel | 711/163 |
| 2007/0011427 | A1 * | 1/2007 | Nelson | 711/170 |
| 2007/0128899 | A1 * | 6/2007 | Mayer | 439/152 |
| 2008/0026853 | A1 | 1/2008 | Crowder, Jr. | |
| 2009/0055611 | A1 | 2/2009 | Adiraju et al. | |

OTHER PUBLICATIONS

"International Application Serial No. PCT/US2008/012604, International Search Report mailed Jan. 16, 2009", 4 pgs.

"International Application Serial No. PCT/US2008/012604, Written Opinion mailed Jan. 16, 2009", 8 pgs.

"U.S. Appl. No. 12/278,875 , Response filed Jan. 9, 2012 to Non Final Office Action mailed Sep. 8, 2011", 9 pgs.

"U.S. Appl. No. 12/278,875, Response filed Mar. 21, 2012 to Final Office Action mailed Jan. 19, 2012", 10 pgs "U.S. Appl. No. 12/278,875, Advisory Action mailed Apr. 4, 2012", 2 pgs.

"U.S. Appl. No. 12/278,875, Examiner Interview Summary", 1 pg., mailed Jan. 19, 2012.

"U.S. Appl. No. 12/278,875, Examiner Interview Summary mailed Mar. 26, 2012", 3 pgs.

"U.S. Appl. No. 12/278,875, Final Office Action mailed Jan. 19, 2012", 14 pgs.

"U.S. Appl. No. 12/278,875, Non Final Office Action mailed Sep. 8, 2011", 11 pgs.

"International Application Serial No. PCT/US2007/004141, International Preliminary Report on Patentability mailed May 8, 2009", 12 pgs.

"International Application Serial No. PCT/US2007/004141, Search Report mailed Jun. 3, 2008", 4 Pgs.

"International Application Serial No. PCT/US2007/004141, Written Opinion mailed Jun. 3, 2008", 6 Pgs.

* cited by examiner

NVRAM MANAGEMENT IN A WAGERING GAME MACHINE

RELATED APPLICATIONS

This patent application is a U.S. National Stage Filing under 35 U.S.C. 371 from International Patent Application Serial No. PCT/US2008/012604, filed Nov. 7, 2008, and published on May 14, 2009, as WO 2009/061488 A1, which claims the priority benefit of U.S. Provisional Patent Application Ser. No. 60/987,028 filed Nov. 9, 2007 and entitled "NVRAM MANAGEMENT IN A WAGERING GAME MACHINE", the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, 2008 WMS Gaming, Inc.

FIELD

Embodiments of the inventive subject matter relate generally to wagering game machines, and more particularly, to memory management within wagering game machines.

BACKGROUND

Wagering game machines, such as slot machines, video poker machines, and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are most likely attracted to the most entertaining and exciting of the machines. Consequently, shrewd operators strive to employ the most entertaining and exciting machines available because such machines attract frequent play and increase profitability for the operator. In the competitive wager gaming machine industry, there is a continuing need for manufacturers to produce new game types or to enhance entertainment and excitement associated with existing wager gaming machines.

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management. One aspect of modern computerized wagering games is that a single console or cabinet is capable of providing several different games.

DETAILED DESCRIPTION

Example Operating Environment

Example Wagering Game Machine Architecture

Figure 1:
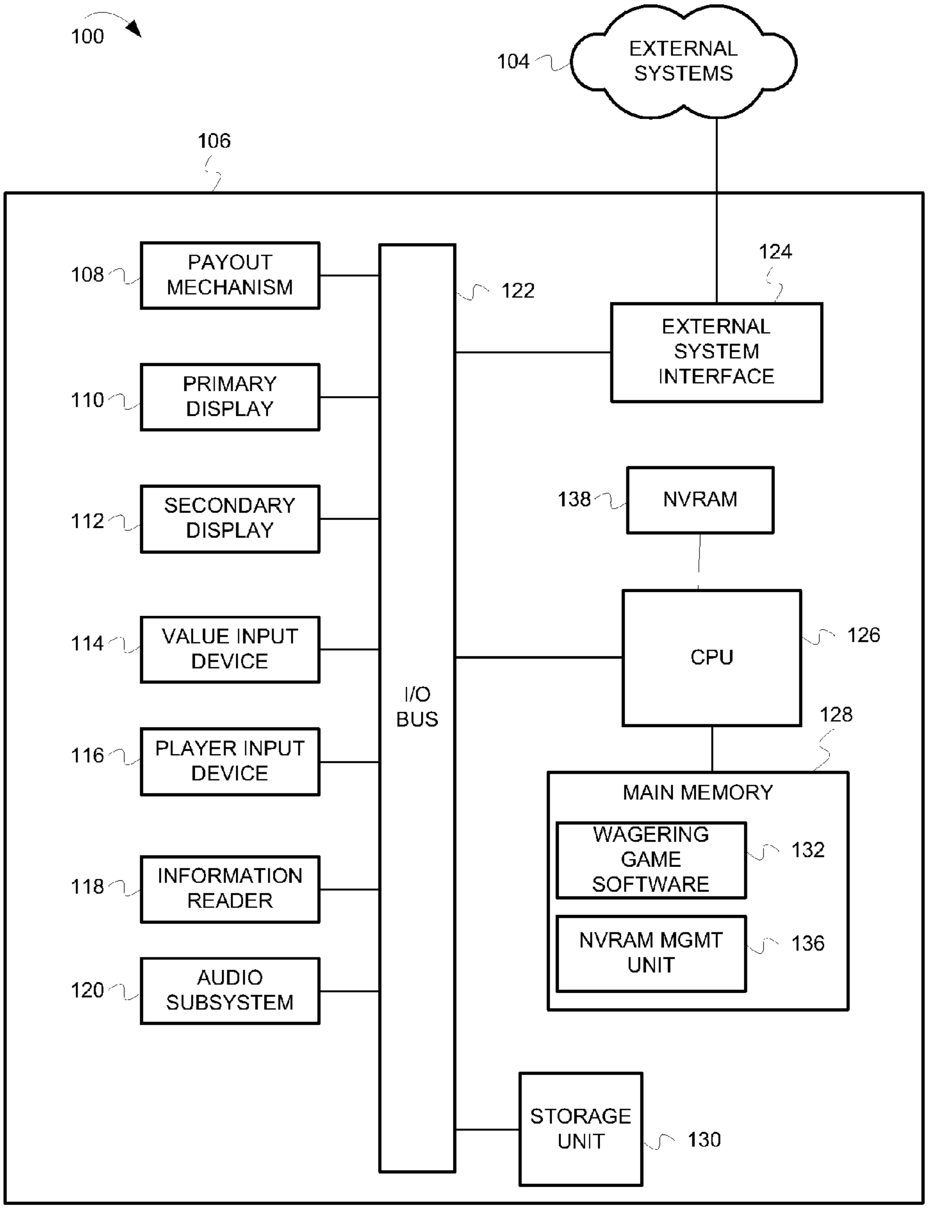
FIG. 1 is a block diagram illustrating a wagering game machine, including a control system, according to example embodiments of the invention.

FIG. 1 is a block diagram illustrating a control system 106 for a wagering game machine 100, according to example embodiments of the invention. As shown in FIG. 1, the control system 106 includes a central processing unit (CPU) 126 connected to main memory 128, which includes wagering game presentation software 132 and NVRAM management unit 136. An NVRAM (Non-Volatile Random Access Memory) module 138 is connected to the CPU 126. In some embodiments, the NVRAM module 138 is a battery-backed random access memory (RAM). In other embodiments, the NVRAM module 138 is a flash memory module, magnetic RAM, FeRAM, phase-change memory (PRAM), optical RAM (ORAM). carbon nanotube technology, or other types of memory capable of preserving information when its power is off. In one embodiment, the wagering game unit 132 can receive wagers and conduct wagering games, such as video poker, video black jack, video slots, video lottery, etc.

The CPU 126 is also connected to an input/output (I/O) bus 122, which facilitates communication between the wagering game machine's components. The I/O bus 122 is connected to a payout mechanism 108, primary display 110, secondary display 112, value input device 114, player input device 116, information reader 118, audio subsystem 120, and storage unit 130. The player input device 116 can include the value input device 114 to the extent the player input device 116 is used to place wagers. In one embodiment, the value input device 114 can electronically receive wagering value (e.g., monetary value) from a player's casino account or other suitable "cashless gaming" value source. The I/O bus 122 is also connected to an external system interface 124, which is connected to external systems 104 (e.g., wagering game networks).

In one embodiment, the control system 106 can include additional peripheral devices and/or more than one of each component shown in FIG. 1. For example, in one embodiment, the control system 106 can include external system interfaces 124 and multiple CPUs 126. In one embodiment, any of the components can be integrated or subdivided. Additionally, in one embodiment, the components of the control system 106 can be interconnected according to any suitable interconnection architecture (e.g., directly connected, hypercube, etc.).

In one embodiment, any of the components of the control system 106 can include hardware, firmware, and/or software for performing the operations described herein. Furthermore, any of the components can include machine-readable media including instructions for causing a machine to perform the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 2A:
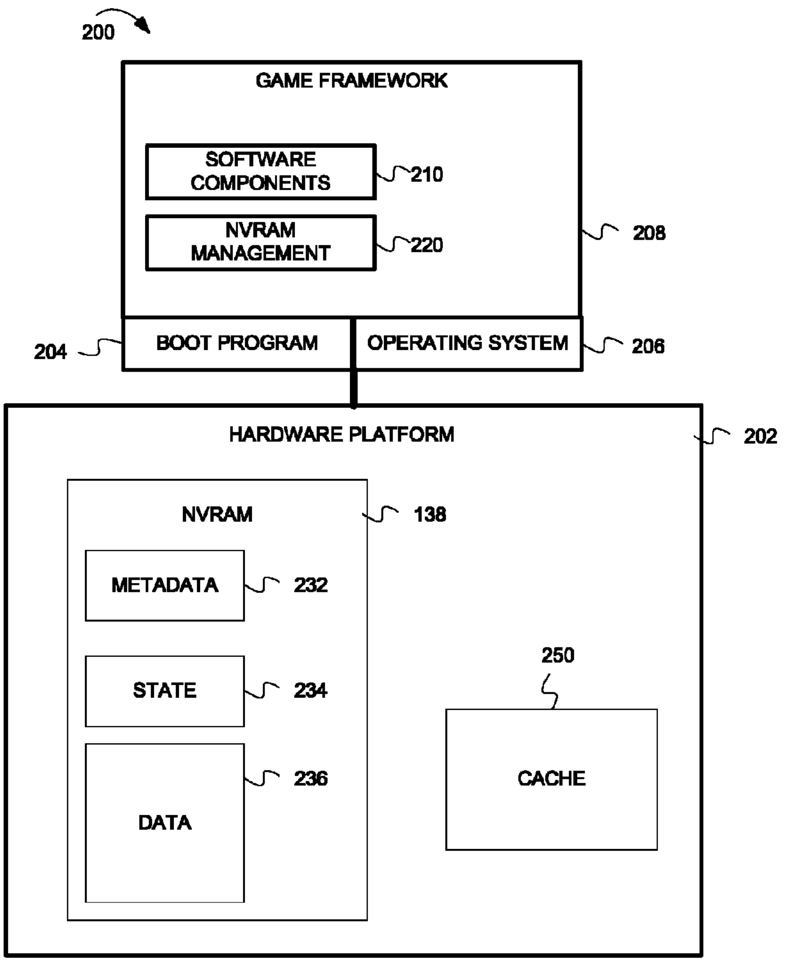
FIG. 2A and FIG. 2B are block diagrams illustrating a wagering game machine software and hardware architecture according to example embodiments of the invention.

FIG. 2A is a block diagram of a software and NVRAM architecture 200 for a wagering game machine according to an example embodiment. As shown in FIG. 2, the wagering game architecture includes a hardware platform 202, a boot program 204, an operating system 206, and a game framework 208 that includes one or more wagering game software components 210 and an NVRAM management component 220. In various embodiments, the hardware platform 202 may include a thin-client, thick-client, or some intermediate derivation. The hardware platform 202 may also be configured to provide a virtual client. The boot program 204 may include a basic input/output system (BIOS) or other initialization program that works in conjunction with the operating system 206 to provide a software interface to the hardware platform 202. The game framework 208 may include standardized game software components either independent or in combination with specialized or customized game software components that are designed for a particular wagering game. In one example embodiment, the wagering game software components 210 may include software operative in connection with the hardware platform 202 and operating system 206 to present wagering games, such as video poker, video black jack, video slots, video lottery, etc., in whole or part. According to another example embodiment, the software components 210 may include software operative to accept a wager from a player. According to another example embodiment, one or more of the software components 210 or 220 may be provided as part of the operating system 206 or other software used in the wagering game system 200 (e.g., libraries, daemons, common services, etc.).

NVRAM management component 220 manages access to NVRAM 138 and may be used to maintain various data structures or data organizations on NVRAM 138. For example, NVRAM management component 220 may maintain metadata 232, state information 234 and data 236. Metadata 232 comprises data that describes how state information 234 and/or data 236 is used, and may also include data regarding the structure or organization of data 236. Data 236 may include various types of data or computer instructions useful in the operation of a wagering game machine. Data 236 may include critical data. Critical data may include one or more of game outcome, credit balance, reel positions, game history, random number generator seeds, game configuration, machine configuration, player information, or other state information or information critical to the operation and record keeping in a gaming machine. The critical data is stored in NVRAM to maintain a player's game state in the case of a sudden power failure.

State information 234 comprises state information regarding data 236. In some embodiments, such state information may include state values that indicate whether particular data structures or values in data 236 have been initialized, zeroed, clean (i.e. valid) and/or whether the data structure or value has been or is to be moved. Furthermore, in some embodiments, NVRAM component 220 may be used to ensure that accesses to NVRAM 138 are performed in an atomic manner.

NVRAM 138 may be maintained as a set of one or more partitions, as a file system, or a combination of the two. For example there may exist a metadata partition, a state partition, and a data partition on NVRAM 138. Each partition may include sub-partitions. The partitions may be composed of blocks of memory, the blocks may have the same size or a variety of block sizes may be used. Additionally, a file system may be used to store data on NVRAM 138. An example file system structure on an NVRAM 138 may include a metadata folder or directory, a state folder or directory, and/or a data folder or directory. Each folder or directory may contain files, directories (folders) providing further structure to the file system.

In some embodiments, hardware platform 202 may include a NVRAM cache 250. NVRAM cache 250 may be a volatile cache, and may be stored on a storage unit 130 available on a wagering game machine. Examples of such storage units include hard drives, RAM memory, flash memory, compact flash memory or any other type of storage unit now known or developed in the future. Some or all of the data written to NVRAM 138 may be duplicated or cached on NVRAM cache 250.

Figure 2B:
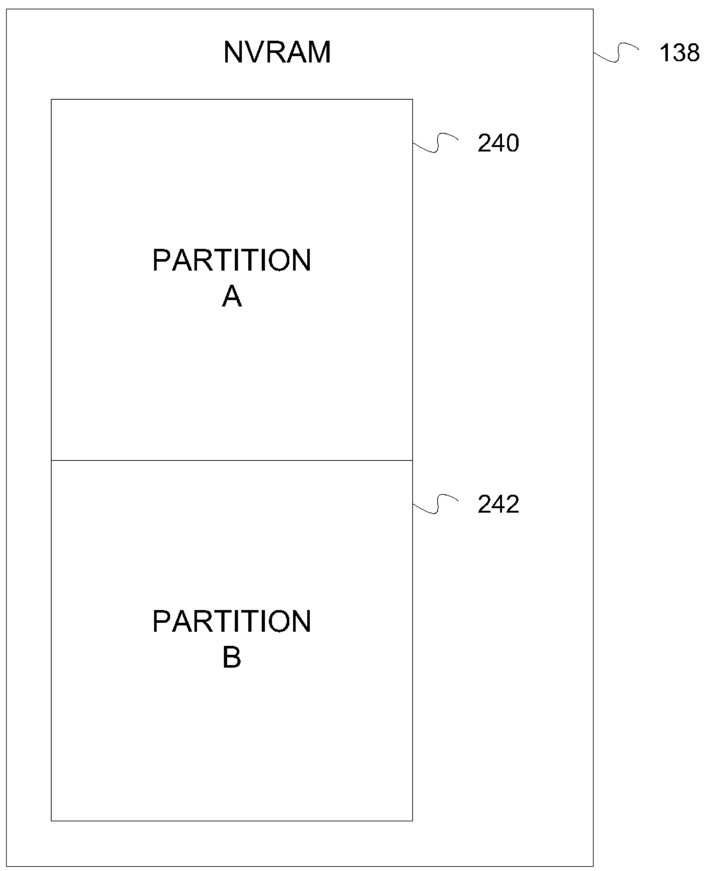

FIG. 2B is a block diagram illustrating an NVRAM 138 having at least two partitions, partition A 240 and partition B 242. In some embodiments, partitions A and B may be used to store distinct data. For example, partition A may store metadata and state information while partition B may store data. Further, partitions A and B may be organized as raw partitions or as file system partition. In alternative embodiments, partition B may be a copy of partition A. The copy may be a mirror copy of partition A, or it may be a copy of partition A that was made at a previous point in time (e.g. a "snapshot"). For example, partition B may be a copy of partition A that was made before a new or additional wagering game was loaded onto the wagering game machine.

Further details on the operations performed by an NVRAM management component 220 are provided below with reference to FIGS. 4-6.

Figure 3:
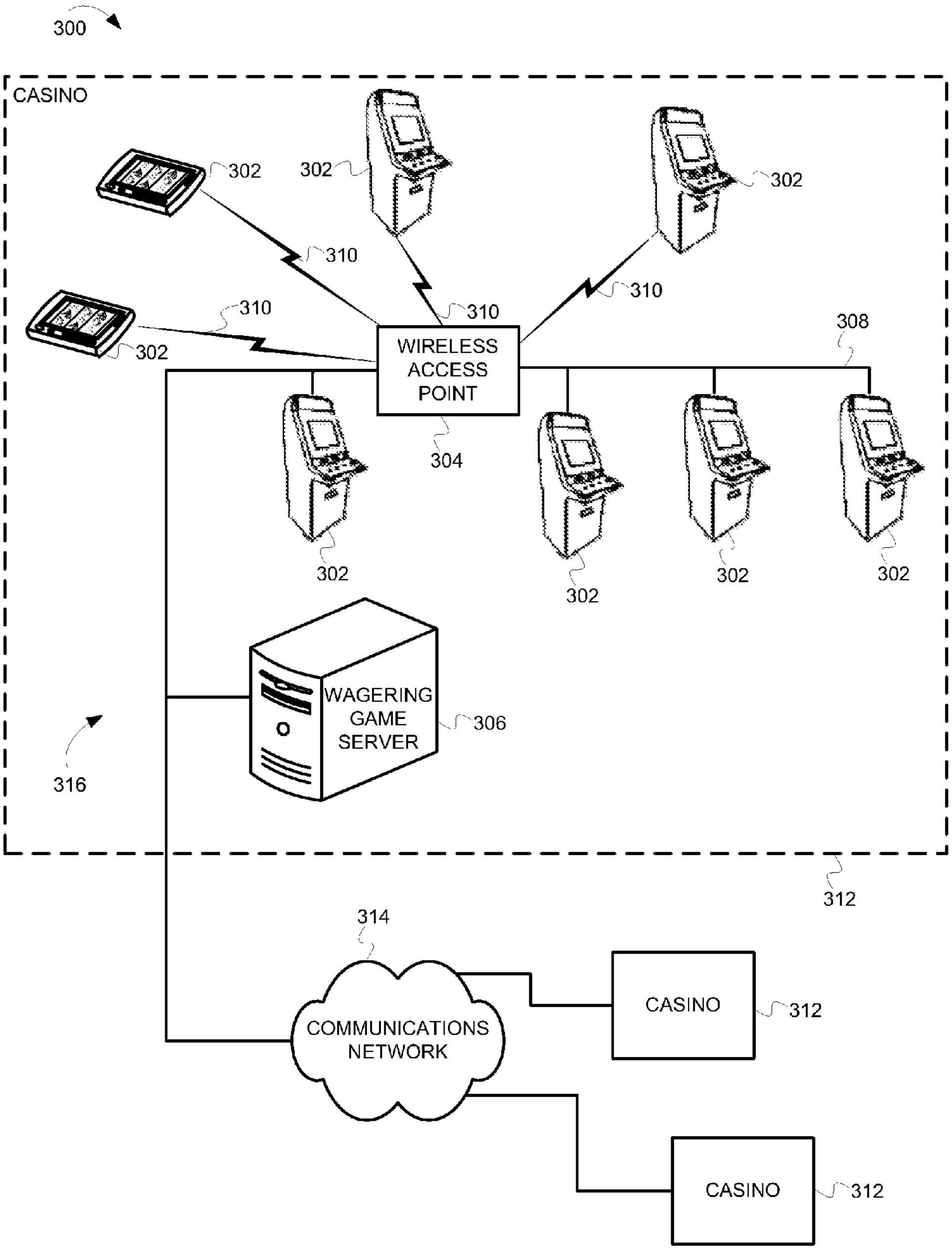
FIG. 3 is a block diagram illustrating a wagering game network, according to example embodiments of the invention.

While FIGS. 1, 2A and 2B describe example embodiments of a wagering game machine hardware and software architecture, FIG. 3 shows how a plurality of wagering game machines can be connected in a wagering game network.

FIG. 3 is a block diagram illustrating a wagering game network 300, according to example embodiments of the invention. As shown in FIG. 3, the wagering game network 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. As such, the local area network 316 includes wireless communication links 310 and wired communication links 308. The wired and wireless communication links can employ any suitable connection technology, such as Bluetooth, 802.11, Ethernet, public switched telephone networks, SONET, etc. In one embodiment, the wagering game server 306 can serve wagering games and/or distribute content to devices located in other casinos 312 or at other locations on the communications network 314.

The wagering game machines 302 and wagering game server 306 can include hardware and machine-readable media including instructions for performing the operations described herein.

The wagering game machines 302 described herein can take any suitable form, such as floor standing models, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like. In a thin-client example, the wagering game server 306 may perform functions such as determining game outcome or managing assets, while the wagering game machine 302 may be used merely to present the graphical representation of such outcome or asset modification to the user (e.g., player). In a thick-client example, game outcome may be determined locally (e.g., at the wagering game machine 302) and then communicated to the wagering game server 306 for recording or managing a player's account.

Similarly, functionality not directly related to game play may be controlled by the wagering game machine 302 (client) or the wagering game server 306 (server) in embodiments. For example, power conservation controls that manage a display screen's light intensity may be managed centrally (e.g., by the wagering game server 306) or locally (e.g., by the wagering game machine 302). Other functionality not directly related to game play may include presentation of advertising, software or firmware updates, system quality or security checks, etc.

Additionally, a wagering game server 306 or other server may operate with a portable wagering game machine 302 as described below to identify gaming establishment devices that are aimed at or pointed at by the portable wagering game machine. The server may maintain a map of the positions of various gaming establishment devices or locations (e.g. wagering game machines, signs, displays, entrances to theaters, arenas, restaurants, hotel services etc.) that may be used to determine which device or location is pointed at by a portable wagering game machine.

Further, server 306 may be an AOM (Administration, Operations, and Maintenance) server. In these embodiments, server 306 may issue commands or response to requests that wagering games or other software be loaded onto a wagering game machine, and may issue commands to cause a wagering game to be rebooted or cause a virtual reboot as described below for a wagering game machine.

Example Wireless Environment

In some embodiments, the wireless access point 304 can be part of a communication station, such as wireless local area network (WLAN) communication station including a Wireless Fidelity (WiFi) communication station, or a WLAN access point (AP). In these embodiments, the wagering game machines 302 can be part of a mobile station, such as WLAN mobile station or a WiFi mobile station.

In some other embodiments, the wireless access point 304 can be part of a broadband wireless access (BWA) network communication station, such as a Worldwide Interoperability for Microwave Access (WiMax) communication station, as the wireless access point 304 can be part of almost any wireless communication device. In these embodiments, the wagering game machines 302 can be part of a BWA network communication station, such as a WiMax communication station.

In some embodiments, any of the wagering game machines 302 can part of a portable wireless communication device, such as a personal digital assistant (PDA), a laptop or portable computer with wireless communication capability, a web tablet, a wireless telephone, a wireless headset, a pager, an instant messaging device, a digital camera, a television or other device that can receive and/or transmit information wirelessly.

In some embodiments, the wireless access point 304 and the wagering game machines 302 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 304 and the wagering game machines 302 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In other embodiments, the wireless access point 304 and the wagering game machines 302 can communicate in accordance with a short-range wireless standard, such as the Bluetooth™ short-range digital communication protocol.

It will be appreciated from the above that various components of a wagering game architecture and/or their functionality may be distributed in various manners. For example, all of the components and functionality may reside in a wagering game machine, or various portions may reside in part on a wagering game machine and in part on a server or other network attached device. The scope of the inventive subject matter is meant to include all of these environments.

Example Operations

Figure 4:
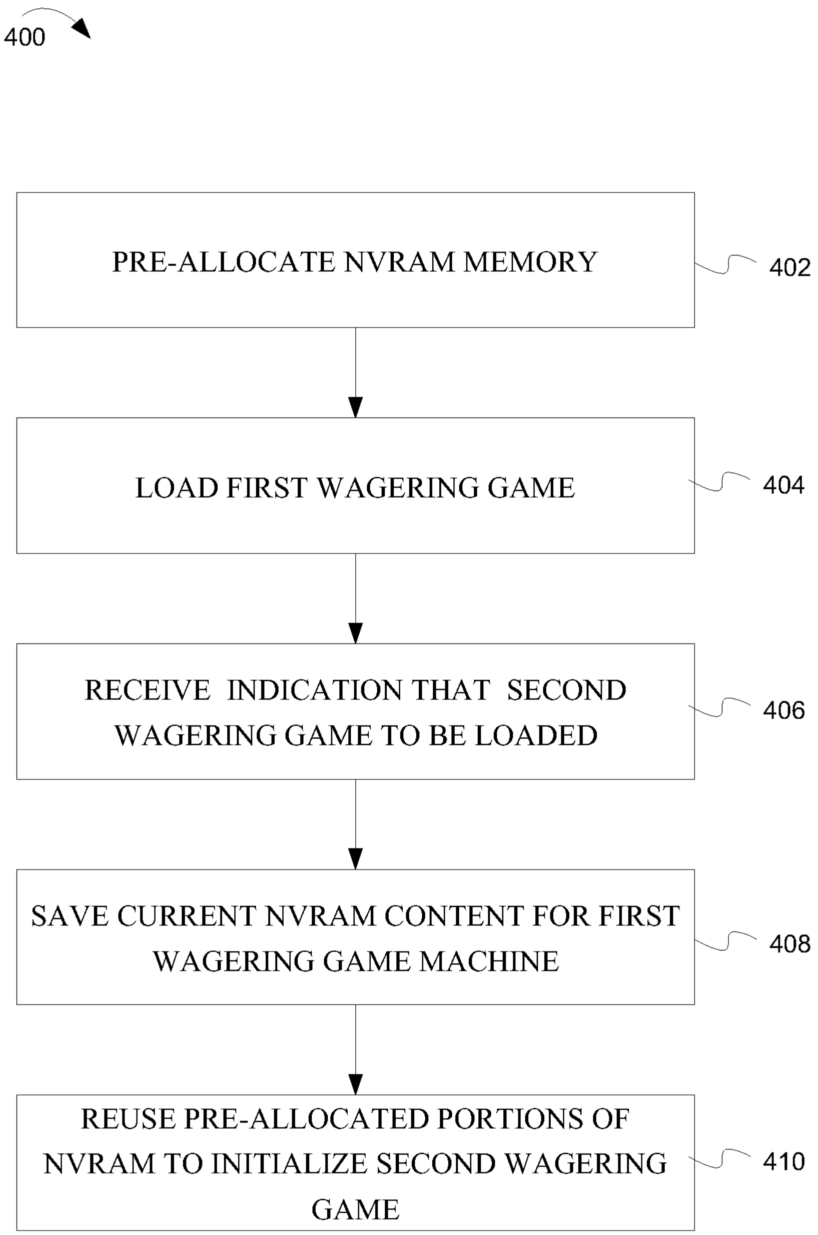
FIG. 4 is a flowchart illustrating generally a method of managing the contents of NVRAM in a wagering game machine, according to example embodiments of the invention.
Figure 5:
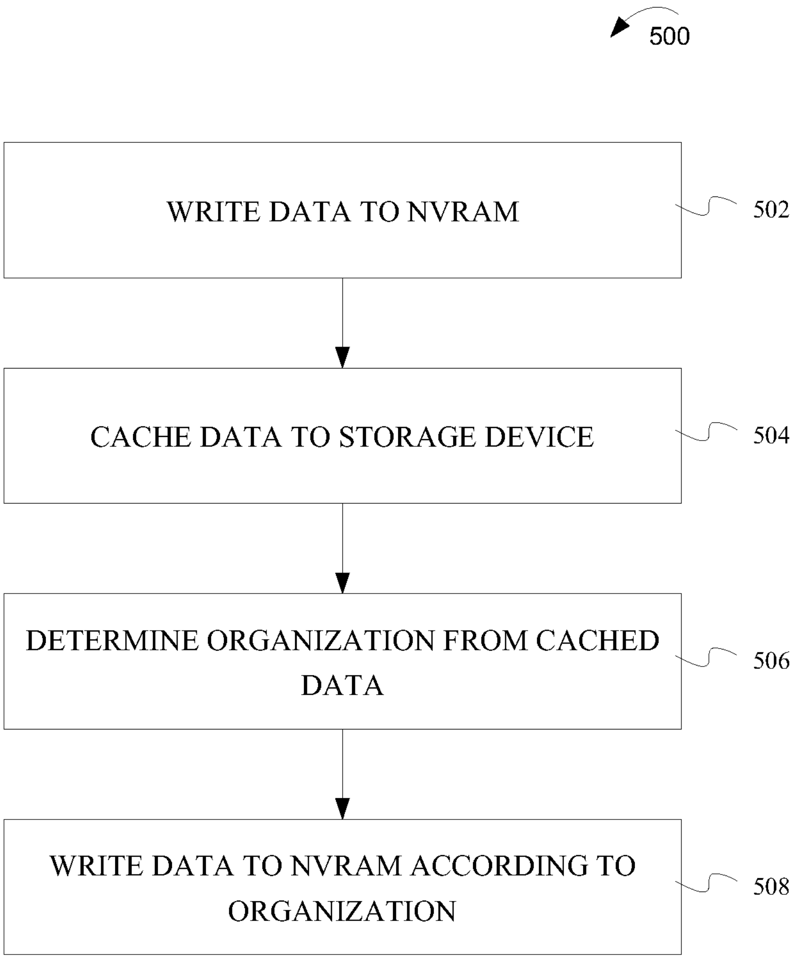
FIG. 5 is a flowchart illustrating generally a method for using a cache with a NVRAM of a wagering game machine according to example embodiments of the invention.
Figure 6:
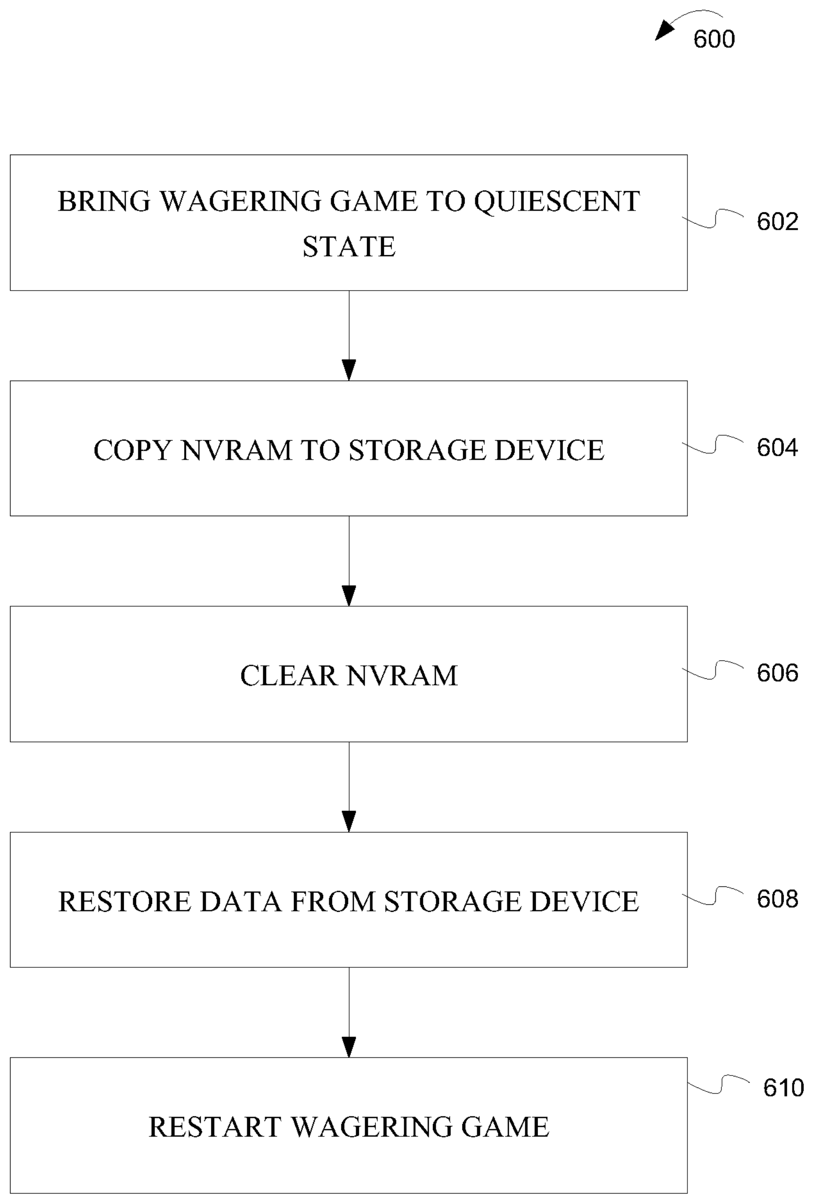
FIG. 6 is a flowchart illustrating generally a method for providing a virtual reboot of a wagering game machine according to example embodiments of the invention.

FIGS. 4-6 illustrate methods for managing NVRAM according to embodiments of the invention. The methods to be performed by an operating environment such as control system 106 and network system 300 constitute computer programs made up of computer-executable instructions.

Describing the methods by reference to a flowchart enables one skilled in the art to develop such programs including such instructions to carry out the method on suitable processors for gaming machines (the processor or processors of the computer executing the instructions from computer-readable media). The methods illustrated in FIGS. 4-6 are inclusive of acts that may be taken by an operating environment executing an exemplary embodiment of the invention.

FIG. 4 is a flowchart illustrating generally a method 400 of managing the contents of NVRAM in a wagering game machine, according to example embodiments of the invention. In some embodiments, method 400 begins at block 402 by pre-allocating portions of NVRAM. In general, pre-allocating may be defined as allocating and reserving memory for various reserved or dedicated purposes before a wagering game begins execution on a wagering game machine. However, the wagering game itself may cause pre-allocation to occur, for example as part of a wagering game initialization process that occurs before the wagering game is presented to a player. The pre-allocation may involve pre-allocating partitions, blocks of memory or files in an NVRAM file system. NVRAM may be pre-allocated for a variety of purposes. For example, one or more portions of NVRAM may be pre-allocated and reserved for critical data associated with a wagering game. Further, memory may be pre-allocated and reserved for denomination data, pay table data etc. Metadata 232 may be used to indicate the purpose and/or amount of memory that has been pre-allocated. In some embodiments, NVRAM may be pre-allocated according to size requirements. For example, a portion of NVRAM that is pre-allocated for critical data may be of sufficient size to hold the largest amount of critical data required by a set of wagering games that are capable of being executed on the wagering game machine.

At block 404, a first wagering game is loaded for execution on the wagering game machine. The first wagering game uses NVRAM that has been pre-allocated. For example, the first wagering game may use a portion of NVRAM that has been pre-allocated for critical data to store critical data for the first wagering game. The first wagering game may consult metadata 232 to determine where in data 236 to store the critical data. Alternatively, a file namespace may be used to determine which file in NVRAM file system is to be used to store critical data.

At block 406, a wagering game machine receives an indication that a second wagering game is to be loaded onto the wagering game machine. The indication that a second wagering game is to be loaded may be received locally. For example, a wagering game machine may provide a user interface (e.g., menus, icons, buttons etc.) showing available games, and a new wagering game may be loaded in response to a selection from the user interface. Additionally, a wagering game may receive the indication that a second wagering game is to be loaded from a remote network source. For example, an AOM server or workstation may issue a command over the network that a new wagering game is to be loaded on the wagering game machine.

In some embodiments, at block 408 a wagering game machine saves some or all of the NVRAM content associated with the first wagering game to a storage unit. The storage unit may be a memory, hard drive or other storage unit 130 that is part of the wagering game control system, or it may be a storage unit located on a server on a wagering game network 300. The data that is saved may include critical data, meter data, game history etc.

At block 410, the wagering game machine reuses memory pre-allocated at block 402 to initialize data for the second wagering game. Metadata 232 may be accessed to determine how the NVRAM is to be used for the second wagering game. For example, if a portion of NVRAM is allocated for critical data, that same portion of NVRAM may be used to maintain critical data for the first wagering game and then reused to maintain critical data for the second wagering game. If the critical data is maintained as a file on a file system in NVRAM, then the file may be used to store critical data for the first wagering game and the same file reused to store critical data for the second wagering game. Similarly, if particular blocks of a partition are allocated to store critical data, then the same blocks used to store critical data for the first wagering game may be reused to store critical data for the second wagering game.

In some embodiments, some portions of NVRAM may be cleared before reuse. NVRAM may be cleared by writing zeros, ones, negative ones, or some other predetermined bit pattern to the desired portions of NVRAM.

It should be noted that the first wagering game and the second wagering game need not use exactly the same amount of NVRAM. For example, a first wagering game may use 150K bytes of NVRAM, while a second wagering game may need only 100K bytes. Memory that is not needed may be cleared prior to reuse or may be ignored.

Further, it should be noted that a portion of NVRAM that is pre-allocated for a particular purpose may grow over time. For example, if a second wagering game is loaded that needs more NVRAM space for critical data, blocks of NVRAM may be added and the metadata updated to indicate the added allocation of NVRAM. Alternatively, a file in a NVRAM file system that has been pre-allocated for storing critical data may grow larger in order to store the second wagering game's critical data.

In order to uninstall a game or theme, in some embodiments the wagering games may be shut down on the wagering game machine Files, partitions or blocks pre-allocated for generic purposes may be selectively cleared, followed by a reloading of content for games or themes that remain on the wagering game machine.

FIG. 5 is a flowchart illustrating generally a method 500 for using a cache with a NVRAM of a wagering game machine according to example embodiments of the invention. The method begins at block 502 when data is written to NVRAM. As data is written, it may also be cached at block 504 to a volatile cache on a storage device. The storage device may be any type of storage device include a hard drive, thumb drive, compact flash memory, an alternate partition of NVRAM, network storage device etc.

At block 506 the cache is analyzed to determine a desirable allocation structure based the data that was cached. For example, analysis of the cache may indicate that certain data should be grouped together in order to provide more efficient or faster access to the data than was provided by the previous organization of data on the NVRAM.

At block 508, NVRAM is structured according to the organization determined at block 506. The NVRAM may be structured by updating metadata values describing how data is stored in NVRAM, or by reorganizing an NVRAM file system.

FIG. 6 is a flowchart illustrating generally a method 600 for providing a virtual reboot of a wagering game machine according to example embodiments of the invention. In general, a virtual reboot resets a certain software on a wagering game machine without requiring an actual reboot of the wagering game machine. The virtual reboot may be in response to a command or menu selection entered at an administrative interface for the wagering game machine or it may come in response to a command received over a network from an AOM server. In certain embodiments, security features exist to ensure that a control signal or command to initiate a virtual reboot is authentic (e.g., a secured wired or wireless channel, use of certificates, encryption schemes, or private networks).

At block 602 the wagering game machine is brought to a quiescent state. Generally speaking, this means that wagering games are gracefully terminated, that is, the wagering game is allowed to complete outstanding tasks or games and then halted such that further game play is not permitted. Other processes or applications that may read or write data to NVRAM may also be gracefully terminated. However, the operating system and some processes may remain running.

At block 604 the contents of NVRAM are copied to a storage unit such as a hard drive, compact flash, universal serial bus (USB) memory stick, optical drive (e.g., CD-RW drive or DVD-RW drive), a network storage device or storage device available to the wagering game machine. In alternative embodiments, the contents of a first partition of NVRAM may be copied to a second partition of NVRAM for later restoration. The contents may be copied to a storage device or alternate NVRAM partition. The content may be copied as a raw image or partition copy. Alternatively, a file by file copy of files in a NVRAM file system may be performed.

At block 606, some or all of NVRAM is cleared using a RAM clear operation. In some embodiments, the clearing is performed by writing zeros to every address location in the NVRAM module 138. This may be preferred to ensure that subsequent wagering games that access a previously used memory range are not able to intentionally or accidentally retrieve false, inconsistent, or inaccurate data related to the previous wagering game data. In other embodiments, only enough of the NVRAM is cleared to destroy a file system on the NVRAM. In some embodiments, clearing is performed by writing ones to certain addresses or ranges of addresses to destroy the data or file system.

At block 608, the data saved at block 604 is restored to the NVRAM from the storage device used to save the NVRAM contents. In some embodiments, a raw image or partition copy is restored to the NVRAM. In embodiments using an NVRAM file system, files saved at block 604 may be copied and restored back to a reinitialized NVRAM file system. In some embodiments, an authentication, verification or confirmation step part of the copying process. For example, after a file is copied for a storage device to the NVRAM module 138, a checksum may be calculated and compared to a known value to verify an accurate copy.

At block 610, a wagering game such as the wagering game terminated at block 602 may be restarted. Other processes or tasks halted at block 602 may also be restarted. At this point the virtual reboot is complete. A virtual reboot is desirable, because it allows a wagering game machine to be partially reset without requiring a total reboot of the wagering game machine, thereby potentially saving technician time and the expense associated with the loss of revenue while the machine is unavailable for wagering game play as is the case when a wagering game machine is rebooted in a non-virtual manner.

Example Wagering Game Machine

Figure 7:
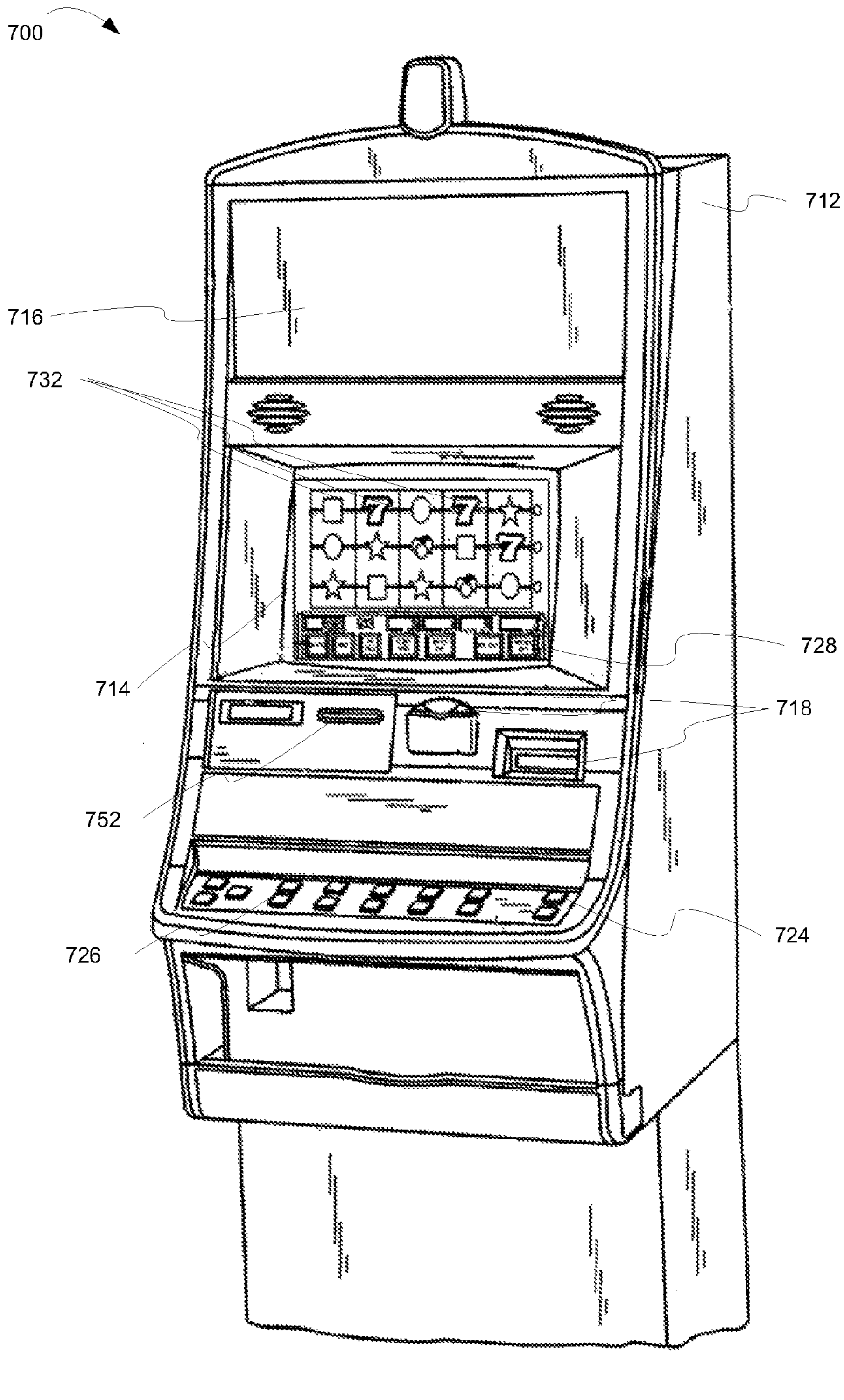
FIG. 7 is a perspective view of a wagering game machine, according to example embodiments of the invention.

FIG. 7 is a perspective view of a wagering game machine, according to example embodiments of the invention. Referring to FIG. 7, a wagering game machine 700 is used in gaming establishments, such as casinos. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model. Further, in some embodiments, the wagering game machine 700 may be include an attached chair assembly, and may include audio speakers designed to provide an enhanced audio environment. For example, a "surround sound" system may be included as part of the wagering game machine and may be integrated with the attached chair.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

Example Portable Wagering Game Machine

Figure 8:
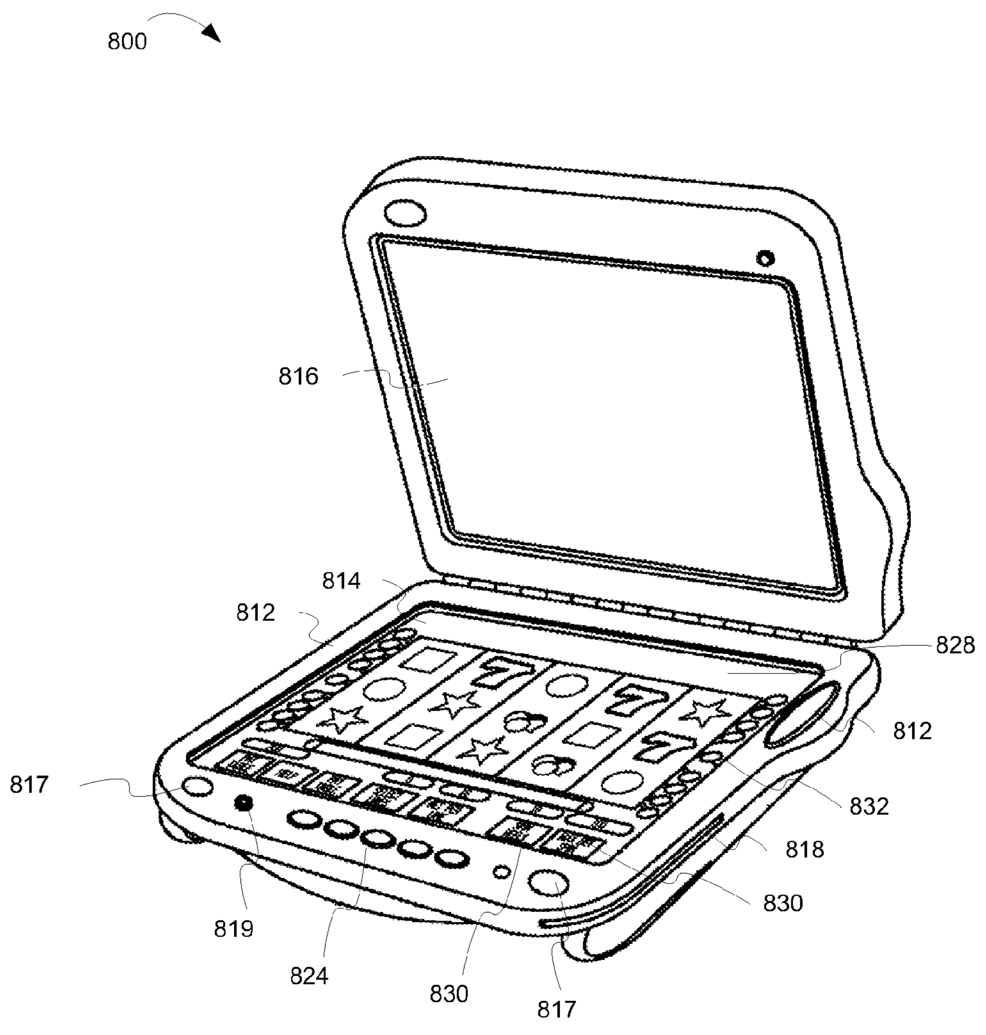
FIG. 8 is a perspective view of a portable wagering game machine, according to example embodiments of the invention.

FIG. 8 shows an example embodiment of a portable wagering game machine 800. The portable wagering game machine 800 can include any suitable electronic handheld or mobile device configured to play a video casino game such as blackjack, slots, keno, poker, blackjack, and roulette. The wagering game machine 800 comprises a housing 812 and includes input devices, including a value input device 818 and a player input device 824. For output, the wagering game machine 800 includes a primary display 814, and may include a secondary display 816, one or more speakers 817, one or more player-accessible ports 819 (e.g., an audio output jack for headphones, a video headset jack, etc.), and other conventional I/O devices and ports, which may or may not be player-accessible. In the embodiment depicted in FIG. 8, the wagering game machine 800 includes a secondary display 816 that is rotatable relative to the primary display 814. The optional secondary display 816 can be fixed, movable, and/or detachable/attachable relative to the primary display 814. Either the primary display 814 and/or secondary display 816 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 818 can comprise, for example, a slot located on the front, side, or top of the casing 812 configured to receive credit from a stored-value card (e.g., casino card, smart card, debit card, credit card, etc.) inserted by a player. The player-accessible value input device 818 can also comprise a sensor (e.g., an RF sensor) configured to sense a signal (e.g., an RF signal) output by a transmitter (e.g., an RF transmitter) carried by a player. The player-accessible value input device 818 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 800.

Still other player-accessible value input devices 818 can require the use of touch keys 830 on the touch-screen display (e.g., primary display 814 and/or secondary display 816) or player input devices 824. Upon entry of player identification information and, preferably, secondary authorization information (e.g., a password, PIN number, stored value card number, predefined key sequences, etc.), the player can be permitted to access a player's account. As one potential optional security feature, the wagering game machine 800 can be configured to permit a player to only access an account the player has specifically set up for the wagering game machine 800. Other conventional security features can also be utilized to, for example, prevent unauthorized access to a player's account, to minimize an impact of any unauthorized access to a player's account, or to prevent unauthorized access to any personal information or funds temporarily stored on the wagering game machine 800.

The player-accessible value input device 818 can itself comprise or utilize a biometric player information reader which permits the player to access available funds on a player's account, either alone or in combination with another of the aforementioned player-accessible value input devices 818. In an embodiment wherein the player-accessible value input device 818 comprises a biometric player information reader, transactions such as an input of value to the wagering game machine 810, a transfer of value from one player account or source to an account associated with the wagering game machine 800, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 818 comprising a biometric player information reader can require a confirmatory entry from another biometric player information reader 852, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 818 can be provided remotely from the wagering game machine 810.

The player input device 824 may include a plurality of push buttons on a button panel for operating the wagering game machine 800. In addition, or alternatively, the player input device 824 can comprise a touch screen mounted to the primary display 814 and/or secondary display 816. In one aspect, the touch screen is matched to a display screen having one or more selectable touch keys 830 selectable by a user's touching of the associated area of the screen using a finger or a tool, such as a stylus pointer. A player enables a desired function either by touching the touch screen at an appropriate touch key 830 or by pressing an appropriate push button on the button panel. The touch keys 830 can be used to implement the same functions as push buttons. Alternatively, the push buttons 826 can provide inputs for one aspect of the operating the game, while the touch keys 830 can allow for input needed for another aspect of the game. The various components of the wagering game machine 800 can be connected directly to, or contained within, the casing 812, as seen in FIG. 8, or can be located outside the casing 812 and connected to the casing 812 via a variety of wired (tethered) or wireless connection methods. Thus, the wagering game machine 800 can comprise a single unit or a plurality of interconnected (e.g., wireless connections) parts which can be arranged to suit a player's preferences.

The operation of the basic wagering game on the wagering game machine 800 is displayed to the player on the primary display 814. The primary display 814 can also display a bonus game associated with the basic wagering game. The primary display 814 preferably takes the form of a high resolution LCD, a plasma display, an LED, or any other type of display suitable for use in the wagering game machine 800. The size of the primary display 814 can vary from, for example, about a 2-3" display to a 15" or 17" display. In at least some embodiments, the primary display 814 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 814 and/or secondary display 816 can have a 16:9 aspect ratio or other aspect ratio (e.g., 4:3). The primary display 814 and/or secondary display 816 can also each have different resolutions, different color schemes, and different aspect ratios.

A player typically begins play of the basic wagering game on the wagering game machine 800 by making a wager (e.g., via the value input device 818 or an assignment of credits stored on the portable wagering game machine 800 via the touch screen keys 830, player input device 824, or buttons 826) on the wagering game machine 800. In some embodiments, the basic game can comprise a plurality of symbols arranged in an array, and includes at least one payline 832 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 818 of the wagering game machine 800 can double as a player information reader 852 that allows for identification of a player by reading a card with information indicating the player's identity (e.g., reading a player's credit card, player ID card, smart card, etc.). The player information reader 852 can alternatively or also comprise a bar code scanner, RFID transceiver or computer readable storage medium interface. In one embodiment, the player information reader 852 comprises a biometric sensing device.

In some embodiments, a portable wagering game machine 800 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

General Comments

In the above detailed description, reference is made to specific examples by way of drawings and illustrations. These embodiments, which are also referred to herein as "examples," are described in sufficient detail to enable those skilled in the art to practice the inventive subject matter, and serve to illustrate how the inventive subject matter may be applied to various purposes or embodiments. Other embodiments are included within the inventive subject matter, as logical, mechanical, electrical, and other changes may be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The above detailed description does not, therefore, limit embodiments of the invention, which are defined only by the appended claims.

Each of the embodiments described herein are contemplated as falling within the inventive subject matter, which is set forth in the following claims.

What is claimed is:

1. A method for execution by one or more processors, the method comprising:

pre-allocating by the one or more processors a plurality of portions of an NVRAM (non-volatile random access memory) in a wagering game machine, each of the plurality of portions having a reserved purpose and being dedicated for the reserved purpose in a plurality of wagering games before the execution of a wagering game on the wagering game machine;

maintaining metadata that indicates the reserved purpose of the plurality of portions of the NVRAM;

initializing a first wagering game, the first wagering game operable to display an outcome in response to receiving a wager of monetary value, the first wagering game using the pre-allocated plurality of portions for their respective reserved purposes;

receiving an indication that a second wagering game is to be loaded;

saving NVRAM content associated with the first wagering game to a storage unit of the wagering game machine in response to receiving the indication that the second wagering game is to be loaded; and initializing the second wagering game, wherein the second wagering game reuses the pre-allocated plurality of portions of the NVRAM used by the first wagering game for their respective reserved purposes as indicated by the metadata;

wherein the pre-allocating is performed independently from any of the wagering games.

2. The method of claim 1, wherein the plurality of portions of NVRAM are pre-allocated according to metadata stored on the NVRAM.

3. The method of claim 1, further comprising storing state information regarding the pre-allocated plurality of portions in a state portion of the NVRAM in metadata.

4. The method of claim 1, wherein pre-allocating the plurality of portions includes pre-allocating one or more files in a file system on the NVRAM.

5. The method of claim 1, wherein the plurality of portions are pre-allocated according to size requirements associated with the purpose of each of the plurality of portions.

6. The method of claim 1, further comprising clearing the pre-allocated plurality of portions in response to receiving the indication that the second wagering game is to be loaded.

7. The method of claim 1, wherein at least one of the plurality of portions stores critical data.

8. The method of claim 1, wherein the storage unit includes a hard drive, compact flash, or network storage device.

9. A method for execution by one or more processors, the method comprising:

pre-allocating by the one or more processors one or more portions of an NVRAM in a wagering game machine, each of the one or more portions having a reserved purpose in a plurality of wagering games, the one or more portions having a first organization and being dedicated for the reserved purpose before the execution of a wagering game on the wagering game machine;

maintaining metadata that indicates the reserved purpose of the pre-allocated one or more portions of the NVRAM;

initializing a wagering game, the wagering game operable display an outcome in response to receiving a wager of monetary value, the wagering game using the pre-allocated one or more portions for their respective reserved purposes;

copying data written to the pre-allocated one or more portions of the NVRAM to a cache on a storage device of the wagering game machine;

analyzing the data in the cache on the storage device to determine a second organization for the pre-allocated one or more portions;

updating metadata values describing how the data is stored in one or more portions of the NVRAM; and reorganizing the pre-allocated one or more portions of the NVRAM in accordance with the second organization;

wherein the pre-allocating is performed independently from any of the wagering games.

10. An apparatus comprising:

at least one processor and a memory;

an NVRAM; and an NVRAM management component executable by the at least one processor and operable to pre-allocate a plurality of portions of the NVRAM, each of the plurality of portions having a reserved purpose in a plurality of wagering games and being dedicated for the reserved purpose before the execution of a wagering game by the at least one processor;

wherein the at least one processor is further operable to:

maintain metadata that indicates the reserved purpose of the plurality of portions of the NVRAM, initializing a first wagering game, the first wagering game operable display an outcome in response to receiving a wager of monetary value, the first wagering game using the pre-allocated plurality of portions for their respective reserved purposes, receive an indication that a second wagering game is to be loaded, save NVRAM content associated with the first wagering game to a storage unit of the wagering game machine in response to the indication that the second wagering game is to be loaded, and initialize the second wagering game, wherein the second wagering game reuses the pre-allocated plurality of portions of the NVRAM used by the first wagering game for their respective reserved purposes as indicated by the metadata;

wherein the pre-allocation by the NVRAM management component is independent from any of the wagering games.

11. The apparatus of claim 10, wherein the plurality of portions of the NVRAM comprise files in a file system on the NVRAM.

12. The apparatus of claim 10, wherein the NVRAM management component is further operable to:

stop the first wagering game or the second wagering game;

copy data from the NVRAM to a storage device;

clear one or more portions of the NVRAM;

restore the copied data to the NVRAM; and restart the first wagering game or the second wagering game.

13. The apparatus of claim 10, wherein the NVRAM is a battery-backed RAM.

14. The apparatus of claim 10, wherein the storage unit includes a hard drive, compact flash, or network storage device.

15. A non-transitory machine-readable medium having processor executable instructions stored thereon for causing one or more processors to execute a method, the method comprising:

pre-allocating a plurality of portions of an NVRAM (non-volatile random access memory) in a wagering game machine, each of the plurality of portions having a reserved purpose and being dedicated for the reserved purpose in a plurality of wagering games before the execution of a wagering game on the wagering game machine;

maintaining metadata that indicates the reserved purpose of the plurality of portions of the NVRAM;

initializing a first wagering game, the first wagering game operable display an outcome in response to receiving a wager of monetary value, the first wagering game using the pre-allocated plurality of portions for their respective reserved purposes;

receiving an indication that a second wagering game is to be loaded;

saving NVRAM content associated with the first wagering game to a storage unit of the wagering game machine in response to receiving the indication that the second wagering game is to be loaded; and initializing the second wagering game, wherein the second wagering game reuses the pre-allocated plurality of portions of the NVRAM used by the first wagering game for their respective reserved purposes as indicated by the metadata;

wherein the pre-allocating is performed independently from any of the wagering games.

16. The non-transitory machine-readable medium of claim 15, wherein the plurality of portions of NVRAM are pre-allocated according to metadata stored on the NVRAM.

17. The non-transitory machine-readable medium of claim 15, wherein the method further comprises storing state information regarding the pre-allocated plurality of portions in a state portion of the NVRAM in metadata.

18. The non-transitory machine-readable medium of claim 15, wherein pre-allocating the plurality of portions includes pre-allocating one or more files in a file system on the NVRAM.

19. The non-transitory machine-readable medium of claim 15, wherein the plurality of portions are pre-allocated according to size requirements.

20. The non-transitory machine-readable medium of claim 15, wherein the method further comprises clearing the pre-allocated plurality of portions in response to receiving the indication that the second wagering game is to be loaded.

21. The non-transitory machine-readable medium of claim 15, wherein at least one of the plurality of portions stores critical data.

22. The non-transitory machine-readable medium of claim 15, wherein the storage unit includes a hard drive, compact flash, or network storage device.

* * * * *